Feb. 1, 1966

D. R. YOUNG 3,232,421

HOLDER FOR TAPE REELS

Filed Jan. 30, 1963

INVENTOR.
DON RICHARD YOUNG
BY
Merchant, Merchant & Gould
ATTORNEYS

United States Patent Office 3,232,421

Patented Feb. 1, 1966

3,232,421

HOLDER FOR TAPE REELS

Don Richard Young, 318 Summit Ave., St. Paul, Minn.

Filed Jan. 30, 1963, Ser. No. 254,907
3 Claims. (Cl. 206—52)

This invention relates generally to holders and storage containers, and more particularly it relates to a book-like holder for tape reels and the like.

This invention is directed to the solution of the problem of providing a suitable storage container or holder for tape reels and the like, such as for example the tape reels for magnetic tape recorders. Since the tape for such devices is easily damaged and often when stored becomes unwound from its reel and thereafter tangled or otherwise mutilated, a suitable storage container or holder for tape reels and the like should provide adequate protection for the tape and also permit the tape to be readily accessible.

Generally speaking, the present invention comprises the provision of a book-like holder for tape reels and the like which includes a pair of hingedly connected leaves having opposed wells or recesses into which the tape reel may be inserted, and which is further arranged and devised so as to adequately protect the tape reel received therein.

An important object of this invention is the provision of a holder for tape reels and the like which is designed and constructed so as to permit the tape reel to be easily inserted and removed from the holder with a minimum of manipulation and effort.

Another object of this invention is the provision of a tape holder for tape reels and the like which is designed and constructed so as to prevent the unwinding of the loose end of the tape contained upon the tape reel whereby to prevent damage to the tape.

Another object of this invention is the provision of a holder for tape reels and the like which is designed and constructed so that the leaves of the holder are biased toward a closed position thereof whereby to retain the enclosed tape reel in a protected condition.

Other objects of this invention reside in the provision of a holder for tape reels and the like which is durable in construction since the same is provided with a minimum of moving parts, which is designed and adapted to provide for the easy storing and labeling of tape reels and the like, and which is further adapted to be placed in a set in the nature of books between a set of book ends.

The above and still further objects and advantages of this invention will become apparent from a consideration of the following detailed specification, appended claims and attached drawings.

Referring to the drawings, wherein like reference characters indicate like parts or elements throughout the several views.

Figures 1, 2, 3, 4, 5, 6:
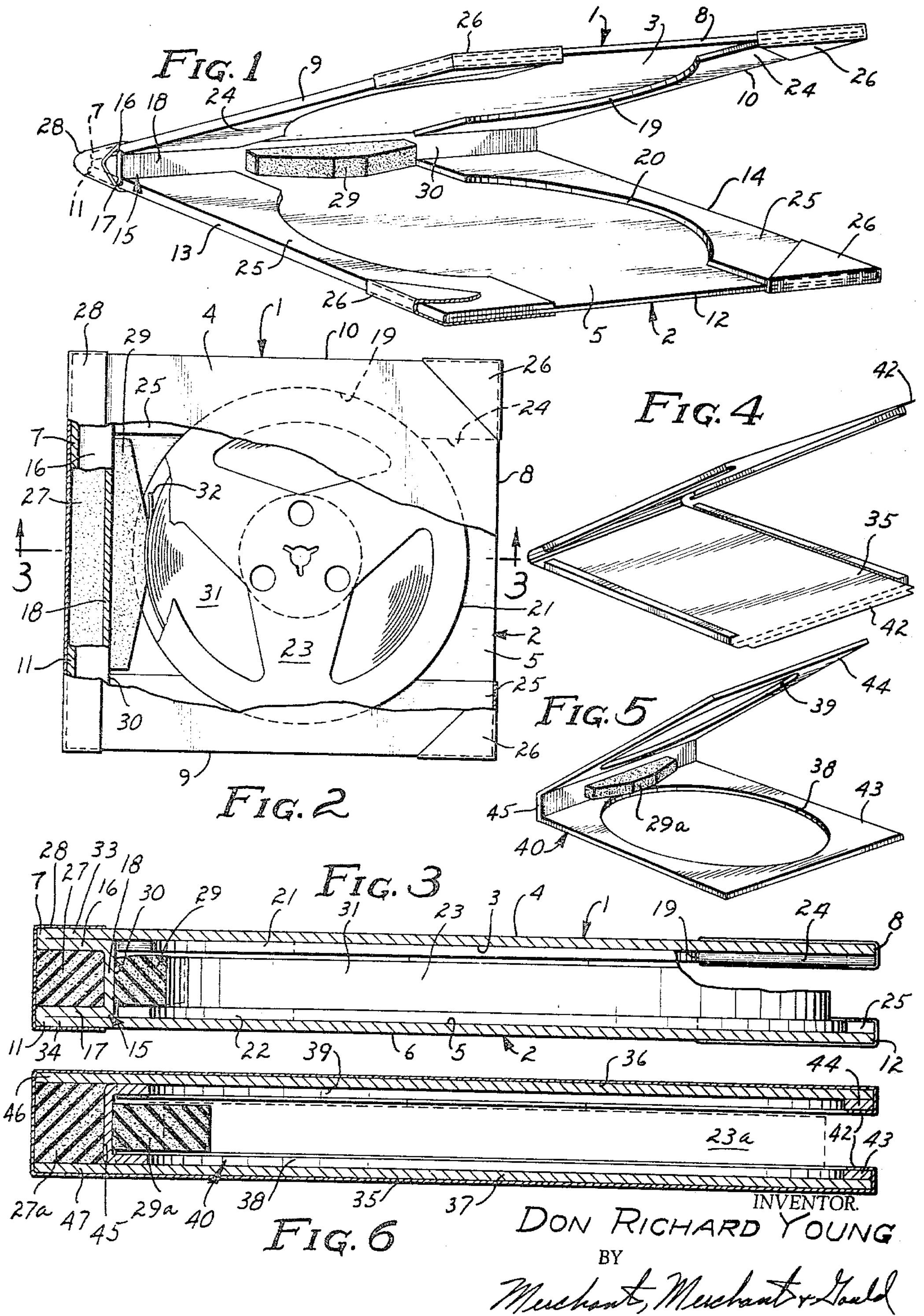
FIG. 1 is a view in perspective of my novel holder for tape reels and the like shown in its open condition, some portions thereof being broken away.
FIG. 2 is a view thereof in top plan showing a tape reel received therein, some portions being broken away.
FIG. 3 is a view in transverse section taken on the line 3—3 of FIG. 2 and showing the holder in its closed condition.
FIG. 4 is a view in perspective of a portion of an alternative embodiment of this invention.
FIG. 5 is a view in perspective of another portion of said alternative embodiment of this invention.
FIG. 6 is a view in section similar to FIG. 3 but showing the alternative embodiment shown in FIGS. 4 and 5.

Referring to the embodiment of this invention shown in FIGS. 1–3, the book-like holder for tape reels and the like shown therein comprises a pair of generally similar generally flat leaves, represented by the reference numerals 1, 2 respectively. The leaves 1, 2 are disposed in general face-to-face relationship with one another whereby the edge portions thereof are in general transverse alignment with one another. The leaf 1 has an inner face 3 and an outer face 4, and the leaf 2 has an inner face 5 and an outer face 6. The connected edge portion of the leaf 1 is represented by the reference numeral 7, the same also having an outer edge portion 8, and side edge portions 9, 10. The connected edge portion of the leaf 2 is represented by the reference numeral 11, the same also having an outer edge portion 12 and side edge portions 13, 14. In accordance with this invention, hinge means is provided for connecting the leaves 1, 2 generally adjacent the connected edge portion 7, 11 thereof for opening and closing pivotal movements of the leaves 1, 2 about said hinge means. The open position of the tape reel holder is shown particularly in FIG. 1, and the closed position thereof is shown in FIG. 3. As shown particularly in FIG. 3, said hinge means comprises a generally U-shaped portion 15 having spaced generally parallel side portions 16, 17 and an intermediate divider portion 18. As illustrated in FIGS. 1 and 3, it will be noted that the leaves 1, 2 and the U-shaped portion 15, which forms the hinged connection between the leaves 1, 2 may be folder from a previously scored single blank of sheet material. As shown particularly in FIG. 3, the relatively stiff divider portion 18 is interposed between the leaves 1, 2 in spaced generally parallel relationship to the aligned connected edge portions 7, 11 whereby the divider portion 18 acts as a fulcrum for the pivotal movements of the leaves 1, 2.

An important feature of this invention is illustrated particularly in FIG. 1, wherein it will be noted that the leaves 1, 2 are constructed so as to provide opposed recesses 19, 20. The opposed recesses 19, 20 are adapted to receive the opposite generally circular side flanges 21, 22 of a tape reel 23. As shown particularly in FIG. 1, the recesses 19, 20 may be easily formed by providing a pair of opposed generally arcuate flaps 24 each of which is positioned adjacent a different one of the side edge portions 9, 10 of the leaf 1, and similar arcuate flaps 25 being disposed adjacent the side edge portions 13, 14 of the leaf 2. As shown in FIG. 1, the arcuate flaps 24, 25 may be formed from the same blank of sheet material from which the leaves 1, 2 are formed, the arcuate flaps 24, 25 being folded upon the inner faces 3, 5 of the leaves 1, 2. The arcuate flaps 24, 25 may be secured to the inner faces 3, 5 of the leaves 1, 2 by any suitable means, such as by gluing. The outer corner portions of the leaves 1, 2 are provided with suitable rigidly secured caps 26 so as to provide additional reinforcement and wear protection.

In order to provide resilient means for biasing the leaves 1, 2 toward the closed position thereof shown in FIG. 3, a filler block 27 of resilient sponge material is interposed in the recess defined by the U-shaped portion 15 of the hinge means noted above. It should be understood that other suitable means may be provided within the scope of the present invention for biasing the leaves 1, 2 in the desired manner, as for example, the provision of a U-shaped portion 15 of the hinge means formed from a relatively stiff material so as to remove the necessity for the filler block 27. A flexible cover element 28 is positioned and secured around the connected edge portions 7, 11 of the leaves 1, 2 so as to enclose the filler block 27.

An important feature of this invention resides in the provision of a resilient retention member 29 interposed between the leaves 1, 2 and secured on the inner surface 30 of the divider portion 18. The retention member 29 is thereby disposed generally at the hinge point between the leaves 1, 2 and is adapted to engage the outer convolution of tape 31 wound upon the tape reel 23 received within the holder. The resilient retention member 29 may also be suitably formed from a resilient sponge or foam material so as to be easily compressible upon insertion of the tape reel 23 within the tape reel holder. The resilient retention member 29 serves two purposes, one of which is to clamp or press the tape reel 23 against the arcuate flaps 24, 25 when the tape reel 23 is inserted within the holder. The other purpose of the resilient retention member 29 is to engage the otherwise loose end portions 32 of the tape when the tape reel 23 is inserted in the holder so as to prevent the unwinding and resulting damage of the tape end. This function of the resilient retention member 29 is shown particularly in FIG. 2.

For ease of reference, the portions of the leaves 1, 2 disposed outwardly of the divider portion 18 and the side portions 16, 17 of the U-shaped portion 15 are referred to herein as plate-like handle portions 33, 34. When it is desired to open the holder 1, the plate-like handle portions 33, 34 are pressed toward one another, and if a tape reel 23 is to be inserted into the holder, the same is placed against the resilient retention member 29 so as to compress the same whereby the tape reel 23 may be received within the recesses 19, 20. Upon release of the plate-like handle portions 33, 34, the opposed leaves 1, 2 will be biased toward their closed condition, shown particularly in FIG. 3. If the tape reel 23 is to be removed from the holder after the same has been moved to its open condition shown in FIG. 1, the tape reel 23 should preferably be moved a slight distance toward the resilient retention member 29 so as to release the pressure exerted thereon by the retention member 29 (which pressure serves to slightly clamp the tape reel 23 within the recesses 19, 20).

An alternative embodiment of this invention is shown particularly in FIGS. 4–6. It should be noted that the alternative embodiment of this invention hereinafter described corresponds in all respects not specifically hereinafter enumerated to the above described embodiment of this invention shown in FIGS. 1–3, and the parts or elements of said alternative embodiment which correspond to like parts or elements in FIGS. 1–3 are denoted by the use of the same reference characters with the subletter *a* added thereto. In this embodiment, an outer cover member 35 formed of a flexible sheet material is provided, along with a pair of relatively rigid generally rectangular leaves 36, 37. Recesses 38, 39 for the tape reel 23 are defined by an insert, represented generally by the reference numeral 40. The insert 40 is aligned and received within the leaves 36, 37, and the cover member 35 has its peripheral edge portions 42 folded upon the insert 40 and secured thereto, as shown particularly in FIGS. 4 and 6. In this embodiment of this invention, the recesses 38, 39 are defined by leaf portions 43, 44 of the insert 40, and an intermediate divider portion 45 acts as a fulcrum for the pivotal movements of the holder between its open and closed conditions. The plate-like handle portions 46, 47 for this embodiment are defined by the portions of the leaves 36, 37 disposed adjacent the intermediate divider portion 45.

The leaves 1, 2 of the first embodiment of this invention described above, and the leaves 36, 37 and insert 40 of the alternative embodiment of this invention are preferably constructed from a relatively stiff material, such as a stiff cardboard material, polystyrene, or other suitable materials. It is noted that the tape reel holders described above may be suitably used in combination with and received within suitable generally tubular cover elements so as to provide additional protection. This invention has been thoroughly tested and found to be completely satisfactory for the accomplishment of the above objects; and while I have shown and described above a preferred embodiment thereof in which the principles of the present invention have been incorporated, I wish it to be specifically understood that the same may be modified without departure from the scope and spirit of the appended claims.

What I claim is:

1. A book-like holder for tape reels and the like, said holder comprising:

(a) a pair of generally flat leaves disposed in general face-to-face relationship whereby the edge portions thereof are in general transverse alignment with one another, (b) hinge means connecting said leaves generally adjacent an aligned pair of edge portions thereof for opening and closing pivotal movements of said leaves thereabout, said hinge means including a relatively stiff divider portion interposed between said leaves in spaced generally parallel relationship to said aligned pair of leaf edge portions and which acts as a fulcrum for the pivotal movements of said leaves, (c) said leaves on the inner faces thereof defining opposed recesses which are adapted to receive a tape reel, and (d) resilient means carried by said holder generally adjacent said hinge means and yieldingly biasing said leaves out of their open position and toward a closed position thereof.

2. A book-like holder for tape reels and the like, said holder comprising:

(a) a pair of generally flat leaves disposed in general face-to-face relationship whereby the edge portions thereof are in general transverse alignment with one another, (b) hinge means connecting said leaves generally adjacent an aligned pair of edge portions thereof for opening and closing pivotal movements of said leaves thereabout, said hinge means including a relatively stiff divider portion interposed between said leaves in spaced generally parallel relationship to said aligned pair of leaf edge portions and which acts as a fulcrum for the pivotal movements of said leaves, (c) said leaves on the inner faces thereof defining opposed recesses which are adapted to receive a tape reel, and (d) resilient means carried by said holder and biasing said leaves toward a closed position thereof, said resilient means comprising a foam-like material interposed between said aligned pair of leaf edge portions and adjacent said divider portion of said hinge means.

3. A book-like holder for tape reels and the like, said holder comprising:

(a) a pair of generally flat leaves disposed in general face-to-face relationship whereby the edge portions thereof are in general transverse alignment with one another, (b) hinge means connecting said leaves generally adjacent an aligned pair of edge portions thereof for opening and closing pivotal movements of said leaves thereabout, said hinge means including a relatively stiff divider portion interposed between said leaves in spaced generally parallel relationship to said aligned pair of leaf edge portions and which acts as a fulcrum for the pivotal movements of said leaves.

(c) said leaves on the inner faces thereof defining opposed recesses which are adapted to receive a tape reel, (d) resilient means carried by said holder and biasing said leaves toward a closed position thereof, said resilient means comprising a foam-like material interposed between said aligned pair of leaf edge portions and adjacent said divider portion of said hinge means, and (e) a resilient retention member interposed between said leaves and positioned generally at the hinge point thereof and adapted to engage the tape of a tape reel received therein.

References Cited by the Examiner

UNITED STATES PATENTS

| | | | |
|---|---|---|---|
| 2,499,623 | 3/1950 | Barnett | 206—52 |
| 2,663,416 | 12/1953 | Hirsch | 206—52 |
| 3,107,010 | 10/1963 | Kulka | 206—53 |
| 3,109,539 | 11/1963 | Turoff | 206—62 |

JOSEPH R. LECLAIR, *Primary Examiner.*

FRANKLIN T. GARRETT, *Examiner.*